(12) United States Patent
Park et al.

(10) Patent No.: US 11,735,721 B2
(45) Date of Patent: Aug. 22, 2023

(54) POSITIVE ELECTRODE ACTIVE MATERIAL FOR LITHIUM SECONDARY BATTERY, METHOD FOR PREPARING THE SAME AND LITHIUM SECONDARY BATTERY INCLUDING THE SAME

(71) Applicant: LG Chem, Ltd., Seoul (KR)

(72) Inventors: Byung Chun Park, Daejeon (KR); Hong Kyu Park, Daejeon (KR); Wang Mo Jung, Daejeon (KR); Seong Hoon Kang, Daejeon (KR)

(73) Assignee: LG Energy Solution, Ltd.

( * ) Notice: Subject to any disclaimer, the term of this patent is extended or adjusted under 35 U.S.C. 154(b) by 212 days.

(21) Appl. No.: 15/515,438

(22) PCT Filed: Oct. 28, 2015

(86) PCT No.: PCT/KR2015/011419
§ 371 (c)(1),
(2) Date: Mar. 29, 2017

(87) PCT Pub. No.: WO2016/068594
PCT Pub. Date: May 6, 2016

(65) Prior Publication Data
US 2017/0222221 A1 Aug. 3, 2017

(30) Foreign Application Priority Data
Oct. 28, 2014 (KR) ........................ 10-2014-0147433

(51) Int. Cl.
*H01M 4/36* (2006.01)
*H01M 4/525* (2010.01)
(Continued)

(52) U.S. Cl.
CPC ............ *H01M 4/366* (2013.01); *C01G 53/42* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS 8,455,139 B2 * 6/2013 Yang .................... H01M 4/5825
252/520.4
9,716,265 B2 * 7/2017 Dai .......................... B01J 19/24
(Continued)

FOREIGN PATENT DOCUMENTS

CN 102760872 A 10/2012
CN 102884659 A 1/2013
(Continued)

OTHER PUBLICATIONS

International Search Report From PCT/KR2015/011419, dated Feb. 12, 2016.
(Continued)

*Primary Examiner* — Amanda C. Walke
(74) *Attorney, Agent, or Firm* — Lerner David LLP

(57) ABSTRACT

The present invention relates to a positive electrode active material for a lithium secondary battery, a method for preparing the same and a lithium secondary battery including the same, the positive electrode active material includes a core including a first lithium complex metal oxide, and a shell located surrounding the core and including a second lithium complex metal oxide, and further includes a buffer layer located between the core and the shell, wherein the buffer layer includes a pore, and a three-dimensional network structure of a third lithium complex metal oxide which
(Continued)

is connecting the core and the shell, and accordingly, minimizing destruction of the active material caused by a rolling process during the electrode preparation, and maximizing reactivity with an electrolyte liquid.

16 Claims, 2 Drawing Sheets

(51) Int. Cl.
*H01M 10/052* (2010.01)
*H01M 4/505* (2010.01)
*C01G 53/00* (2006.01)
*H01M 10/0525* (2010.01)
*H01M 4/02* (2006.01)

(52) U.S. Cl.
CPC ......... *H01M 4/525* (2013.01); *H01M 10/052* (2013.01); *H01M 10/0525* (2013.01); *C01P 2004/61* (2013.01); *C01P 2004/84* (2013.01); *C01P 2004/88* (2013.01); *H01M 2004/021* (2013.01); *H01M 2004/028* (2013.01)

(56) References Cited

U.S. PATENT DOCUMENTS

| | | | |
|---|---|---|---|
| 2004/0013943 A1* | 1/2004 | Stoker | H01M 4/0419 429/231.95 |
| 2004/0200998 A1 | 10/2004 | Park et al. | |
| 2009/0029253 A1 | 1/2009 | Itou et al. | |
| 2012/0276446 A1 | 11/2012 | Kawai | |
| 2013/0029216 A1 | 1/2013 | Kim et al. | |
| 2013/0078520 A1 | 3/2013 | Toya et al. | |
| 2014/0065298 A1* | 3/2014 | Yanagisawa | C01G 23/005 427/77 |
| 2014/0124701 A1* | 5/2014 | Vanhatalo | H01M 4/525 252/182.1 |
| 2014/0158932 A1 | 6/2014 | Sun et al. | |
| 2014/0205901 A1 | 7/2014 | Nagai et al. | |
| 2014/0335417 A1 | 11/2014 | Nagai | |
| 2014/0377660 A1* | 12/2014 | Fukui | C01G 53/006 429/223 |
| 2015/0024207 A1* | 1/2015 | Kase | H01M 4/505 428/402 |
| 2016/0093885 A1 | 3/2016 | Kamata et al. | |
| 2018/0013129 A1 | 1/2018 | Lee et al. | |
| 2018/0048015 A1 | 2/2018 | Lee et al. | |

FOREIGN PATENT DOCUMENTS

| | | |
|---|---|---|
| CN | 103493259 A | 1/2014 |
| CN | 103988348 A | 8/2014 |
| EP | 2557068 A1 | 2/2013 |
| EP | 3249723 A1 | 11/2017 |
| EP | 3312912 A1 | 4/2018 |
| JP | 2004050147 A | 2/2004 |
| JP | 2005314147 A | 11/2005 |
| JP | 2006216374 A | 8/2006 |
| JP | 4726896 B2 | 7/2011 |
| JP | 2012238581 A | 12/2012 |
| JP | 2013051172 A | 3/2013 |
| JP | 2013134871 A | 7/2013 |
| KR | 20030083476 A | 10/2003 |
| KR | 20060130964 A | 12/2006 |
| KR | 100752703 B1 | 8/2007 |
| KR | 20130076795 A | 7/2013 |
| KR | 20130138147 A | 12/2013 |
| KR | 20140098526 A | 8/2014 |
| WO | 2006104367 A2 | 10/2006 |
| WO | 2013070298 A2 | 5/2013 |
| WO | 20130084851 A1 | 6/2013 |
| WO | 2014181891 A1 | 11/2014 |

OTHER PUBLICATIONS

Database WPI Week 200578, Clarivate Analytics, Thomson Scientific, London, GB; AN 2005-763509 XP002771979, pp. 1-2.
Extended European Search Report for Application No. EP15856067 dated Jul. 28, 2017.
Chinese Search Report for Application No. 201580059083.4 dated Mar. 26, 2020, 1 pages.
Chinese Search Report for Application No. CN 201580059083.4 dated Sep. 2, 2019, 1 page.

* cited by examiner

POSITIVE ELECTRODE ACTIVE MATERIAL FOR LITHIUM SECONDARY BATTERY, METHOD FOR PREPARING THE SAME AND LITHIUM SECONDARY BATTERY INCLUDING THE SAME

CROSS-REFERENCE TO RELATED APPLICATION

The application is a national phase entry under 35 U.S.C. § 371 of International Application No. PCT/KR2015/011419, filed Oct. 28, 2015, which claims priority to Korean Patent Application No. 10-2014-0147433, filed Oct. 28, 2014, the disclosures of which are incorporated herein by reference.

FIELD OF THE INVENTION

The present invention relates to a positive electrode active material for a lithium secondary battery, a method for preparing the same, and a lithium secondary battery including the same.

DESCRIPTION OF THE RELATED ART

With increases in technology developments and demands for mobile devices, demands for secondary batteries as an energy source have rapidly increased, and among such secondary batteries, lithium secondary batteries having high energy density and voltage, a long cycle life, and a low self-discharge rate have been commercialized and widely used.

However, lithium secondary batteries have a problem in that battery life rapidly decreases as charge and discharge are repeated. Such a problem is particularly more series at high temperatures. This is due to a phenomenon occurring when an electrolyte is decomposed or an active material is deteriorated due to moisture inside the battery or other influences, or inner resistance of the battery increases.

In view of the above, a positive electrode active material for a lithium secondary battery actively used currently through research and development is a layer-structured $LiCoO_2$. $LiCoO_2$ is most widely used due to its excellent life property and charge and discharge efficiency, but has low structural stability, and therefore, has a limit in being used in technologies enabling batteries to have high capacity.

Various lithium transition metal oxides such as $LiNiO_2$, $LiMnO_2$, $LiMn_2O_4$, $LiFePO_4$ and $Li(Ni_xCo_yMn_z)O_2$ have been developed as an alternative positive electrode active material. Among these, $LiNiO_2$ has an advantage of exhibiting a battery property of high discharge capacity, but has a problem of being difficult to be synthesized using a simple solid state reaction, and having poor thermal stability and cycle property. In addition, lithium manganese-based oxides such as $LiMnO_2$ or $LiMn_2O_4$ have an advantage of excellent thermal safety and low costs, but have a problem of small capacity and a poor high temperature property. Particularly, some $LiMn_2O_4$ has been commercialized as low-priced products, but does not have a favorable life property due to structural distortion (Jahn-Teller distortion) caused by $Mn^{3+}$. Furthermore, extensive studies have been made on $LiFePO_4$ for application in hybrid electric vehicles (HEV) due to its low costs and excellent safety, however, $LiFePO_4$ is difficult to be used in other fields due to its low conductivity.

Under such circumstances, a material mostly favored as an alternative positive electrode active material for $LiCoO_2$ is a lithium-nickel-manganese-cobalt oxide, $Li(Ni_xCo_yMn_z)O_2$ (herein, x, y, z are each independently an atomic fraction of oxide-composition elements, and $0<x\le 1$, $0<y\le 1$, $0<z\le 1$ and $0<x+y+z\le 1$). This material is less expensive than $LiCoO_2$, and has an advantage of being used under high capacity and high voltage, but has a disadvantage of inferior rate capability and life property at high temperatures.

Accordingly, methods for preparing a positive electrode active material capable of enhancing lithium secondary battery performance through changing compositions in a lithium transition metal oxide or controlling a crystal structure have been urgently required.

As portable devices such as mobile phones and tablet Pcs have become smaller, batteries used therein have been required to be smaller, and to have high capacity and energy as well. In order to increase energy per unit volume in a battery, packing density of an active material needs to be increased, or a voltage needs to be increased. In addition, using an active material having large particles is favorable in increasing packing density. However, a surface area of the active material having such large particles is relatively small, and an active area in contact with an electrolyte liquid is also small. Such a small active area disadvantageously works kinetically, which results in relatively low rate capability and initial capacity.

DISCLOSURE OF THE INVENTION

Technical Problem

In view of the above, an aspect of the present invention is to provide a positive electrode active material for a lithium secondary battery having a high output property and a life property, and a method for preparing the same.

Another aspect of the present invention is to provide a positive electrode, a lithium secondary battery, a battery module and a battery pack including the positive electrode active material.

Still another aspect of the present invention is to provide a precursor useful for preparing the positive electrode active material and a method for preparing the same.

Technical Solution

In other words, the present invention has the following constitutions:

(1) A positive electrode active material for a lithium secondary battery including a core including a first lithium complex metal oxide, a shell located surrounding the core, and including a second lithium complex metal oxide, and a buffer layer located between the core and the shell, wherein the buffer layer includes a pore and a three-dimensional network structure of a third lithium complex metal oxide which is connecting the core and the shell.

(2) The positive electrode active material for a lithium secondary battery described in (1), wherein the core is a primary particle of the first lithium complex metal oxide, or a secondary particle that is an aggregate of the primary particles.

(3) The positive electrode active material for a lithium secondary battery described in (1) or (2), wherein the pore is included in 5% by volume to 30% by volume to the total volume of the positive electrode active material.

(4) The positive electrode active material for a lithium secondary battery described in any one of (1) to (3), wherein, in the shell, the second lithium complex metal oxide has crystal orientation oriented from the center to the surface of the active material particle in a radial form.

(5) The positive electrode active material for a lithium secondary battery described in any one of (1) to (4), wherein the shell further includes a pore between particles of the second lithium complex metal oxide.

(6) The positive electrode active material for a lithium secondary battery described in any one of (1) to (5), wherein an area of the shell determined from the following Mathematical Formula 1 is from 0.2 to 1.

Shell area=(positive electrode active material radius-core radius-buffer layer thickness)/positive electrode active material radius  [Mathematical Formula 1]

(7) The positive electrode active material for a lithium secondary battery described in any one of (1) to (6), wherein a ratio of the core radius to the positive electrode active material radius is greater than 0 and less than 0.4, and a ratio of the length from the positive electrode active material particle center to an interface between the buffer layer and the shell to the positive electrode active material particle radius is greater than 0 and less than 0.7.

(8) The positive electrode active material for a lithium secondary battery described in any one of (1) to (7), wherein the core has an average particle diameter ($D_{50}$) of 0.2 μm to 10 μm.

(9) The positive electrode active material for a lithium secondary battery described in any one of (1) to (8), wherein the shell has a thickness of 0.5 μm to 8 μm.

(10) The positive electrode active material for a lithium secondary battery described in any one of (1) to (9), which has an average particle diameter ($D_{50}$) of 2 μm to 20 μm.

(11) The positive electrode active material for a lithium secondary battery described in any one of (1) to (10), wherein the first to the third lithium complex metal oxides are each independently a lithium complex metal oxide including lithium, and one or more types of metals selected from the group consisting of cobalt, manganese, nickel and aluminum.

(12) The positive electrode active material for a lithium secondary battery described in any one of (1) to (11), wherein the first to the third lithium complex metal oxides are each independently include a compound of the following Formula 1.

$$Li_aNi_{1-x-y}Co_xM1_yM3_zM2_wO_2$$  [Formula 1]

(In Formula 1, M1 includes any one, two or more elements selected from the group consisting of Al and Mn, M2 includes any one, two or more elements selected from the group consisting of Zr, Ti, Mg, Ta and Nb, and M3 includes any one, two or more elements selected from the group consisting of W, Mo and Cr, and $1.0 \le a \le 1.5$, $0 < x \le 0.5$, $0 < y \le 0.5$, $0 \le z \le 0.03$, $0 \le w \le 0.02$ and $0 < x+y \le 0.7$)

(13) The positive electrode active material for a lithium secondary battery described in any one of (1) to (12), further including a surface treating layer including a lithium oxide of the following Formula 2 on the surface.

$$Li_mMeO_{(m+n)/2}$$  [Formula 2]

(In Formula 2, Me includes any one, two or more elements selected from the group consisting of B, W, Hf, Nb, Ta, Mo, Si, Sn and Zr, $2 \le m \le 10$, and n is an oxidation number of Me)

(14) A method for preparing the positive electrode active material for a lithium secondary battery described in any one of (1) to (13), the method including preparing a reaction solution in which metal-containing compound particles are produced by adding an ammonium cation-containing complex forming agent and a basic compound to a solution including a metal raw material for forming a lithium complex metal oxide, and coprecipitation reacting the result under pH 10.5 to pH 12; preparing a precursor by adding an ammonium cation-containing complex forming agent and a basic compound to the reaction solution until the reaction solution has a pH of 10.5 or less to grow the metal-containing compound particles at a temperature lower than the temperature at which the metal-containing compound particles are produced; and mixing the precursor with a lithium-containing raw material and then heating the result.

(15) The method for preparing the positive electrode active material for a lithium secondary battery described in (14), wherein the preparing of a reaction solution in which metal-containing compound particles are produced is carried out at 30° C. to 70° C.

(16) The method for preparing the positive electrode active material for a lithium secondary battery described in (14) or (15), wherein the ammonium cation-containing complex forming agent includes any one, or a mixture of two or more selected from the group consisting of $NH_4OH$, $(NH_4)_2SO_4$, $NH_4NO_3$, $NH_4Cl$, $CH_3COONH_4$ and $NH_4CO_3$.

(17) The method for preparing the positive electrode active material for a lithium secondary battery described in any one of (14) to (16), wherein the basic compound includes any one, or a mixture of two or more selected from the group consisting of an alkali metal hydrate, an alkali metal hydroxide, an alkali-earth metal hydrate and an alkali-earth metal hydroxide.

(18) The method for preparing the positive electrode active material for a lithium secondary battery described in any one of (14) to (17), wherein the preparing of a precursor is carried out at a temperature lower by 5° C. to 20° C. than the temperature at which the metal-containing compound particles are produced.

(19) The method for preparing the positive electrode active material for a lithium secondary battery described in any one of (14) to (18), wherein the heating is carried out at a temperature of 700° C. to 1000° C.

(20) The method for preparing the positive electrode active material for a lithium secondary battery described in any one of (14) to (19), further including, after the heating, forming a surface treating layer including a compound of the following Formula 2 on a surface of the positive electrode active material by surface treating the prepared positive electrode active material using a composition including a lithium oxide of the following Formula 2, or mixing the prepared positive electrode active material with a Me raw material and then heating the result.

$$Li_4MeO_{(m+n)/2}$$  [Formula 2]

(In Formula 2, Me includes any one, two or more elements selected from the group consisting of B, W, Hf, Nb, Ta, Mo, Si, Sn and Zr, $2 \le m \le 10$, and n is an oxidation number of Me)

(21) A positive electrode for a lithium secondary battery including the positive electrode active material described in any one of (1) to (13).

(22) A lithium secondary battery including the positive electrode described in (21).

(23) A battery module including the lithium secondary battery described in (22) as a unit cell.

(24) A battery pack including the battery module described in (23).

(25) The battery pack described in (24), which is used as a power source of medium to large size devices.

(26) The battery pack described in (25), wherein the medium to large size devices are selected from the group consisting of electric vehicles, hybrid electric vehicles, plug-in hybrid electric vehicles and systems for power storage.

(27) A method for preparing a positive electrode active material precursor for a lithium secondary battery, the method including preparing a reaction solution in which metal-containing compound particles are produced by adding an ammonium cation-containing complex forming agent and a basic compound to a solution including a metal raw material for forming a lithium complex metal oxide, and coprecipitation reacting the result under pH 10.5 to pH 12; and growing the metal-containing compound particles by adding an ammonium cation-containing complex forming agent and a basic compound to the reaction solution until the reaction solution has a pH of 10.5 or less at a temperature lower than the temperature at which the metal-containing compound particles are produced.

(28) A positive electrode active material precursor for a lithium secondary battery prepared by the preparation method described in (27), the precursor including a core; and a shell located on a surface of the core, wherein the shell includes metal-containing compound particles having crystal orientation oriented from the center to the surface of the precursor particle in a radial form.

(29) The positive electrode active material precursor for a lithium secondary battery described in (28), wherein the metal-containing compound particle in the shell has a fiber shape with an aspect ratio of greater than 1.

(30) The positive electrode active material precursor for a lithium secondary battery described in (28) or (29), wherein the shell has lower density than the core.

(31) The positive electrode active material precursor for a lithium secondary battery described in any one of (28) to (30), wherein the metal-containing compounds in the core and the shell are each independently include a compound of the following Formula 3.

$$Ni_{1-x-y}Co_xM1_yM3_zM2_wZ$$ [Formula 3]

(In Formula 3, M1 includes any one, two or more elements selected from the group consisting of Al and Mn, M2 includes any one, two or more elements selected from the group consisting of Zr, Ti, Mg, Ta and Nb, and M3 includes any one, two or more elements selected from the group consisting of W, Mo and Cr, Z is a hydroxyl group or an oxyhydroxyl group, and $0<x\leq0.5$, $0<y\leq0.5$, $0\leq z\leq0.03$, $0\leq w\leq0.02$ and $0<x+y\leq0.7$)

Other specifics of the embodiments of the present invention are described below in the mode for carrying out the invention.

Advantageous Effects

A positive electrode active material for a lithium secondary battery according to the present invention includes, between a core and a shell in a particle having a core-shell structure, a third-dimensional network structure connecting the core and the shell and a buffer layer having a pore located in the network structure, and therefore, is capable of enhancing an output property and a life property of a lithium secondary battery by minimizing destruction of the active material caused by a rolling process during the electrode preparation, maximizing reactivity with an electrolyte liquid, and by the particles that form the shell having a crystal structure with orientation facilitating lithium ion intercalation and deintercalation. Accordingly, the positive electrode active material according to the present invention is useful as a positive electrode active material in batteries requiring high capacity, long life and high output properties such as batteries for automobiles or batteries for electric tools, particularly, batteries requiring minimum performance deterioration under a high voltage such as batteries for electric vehicles.

DESCRIPTION OF DRAWINGS

The drawings accompanied in the present specification illustrate preferred embodiments of the present invention, and performs a role of further illuminating technological ideas of the present invention together with the contents of the invention described above, and accordingly, the present invention is not to be interpreted limiting to those described in the drawings.

REFERENCE NUMERAL

1 Core
2 Shell
3 Buffer Layer
3a Pore
3b Three-Dimensional Network Structure
10 Positive Electrode Active Material

MODE FOR CARRYING OUT THE INVENTION

Hereinafter, the present invention will be described in more detail in order to illuminate the present invention.

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

A positive electrode active material for a lithium secondary battery according to an embodiment of the present invention includes a core including a first lithium complex metal oxide; a shell located surrounding the core, and including a second lithium complex metal oxide; and a buffer layer located between the core and the shell, wherein the buffer layer includes a pore, and a three-dimensional network structure of a third lithium complex metal oxide which is connecting the core and the shell.

As described above, by further forming a buffer layer including a pore and a third-dimensional network structure which is connecting the core and the shell between the core and the shell in the particles having a core-shell structure, the positive electrode active material for a secondary battery according to an embodiment of the present invention is capable of enhancing an output property and a life property of a lithium secondary battery by minimizing destruction of the active material caused by a rolling process in electrode preparation, maximizing reactivity with an electrolyte liquid, and by the particles that form the shell having a crystal structure with orientation facilitating lithium ion intercalation and deintercalation.

Figure 1:
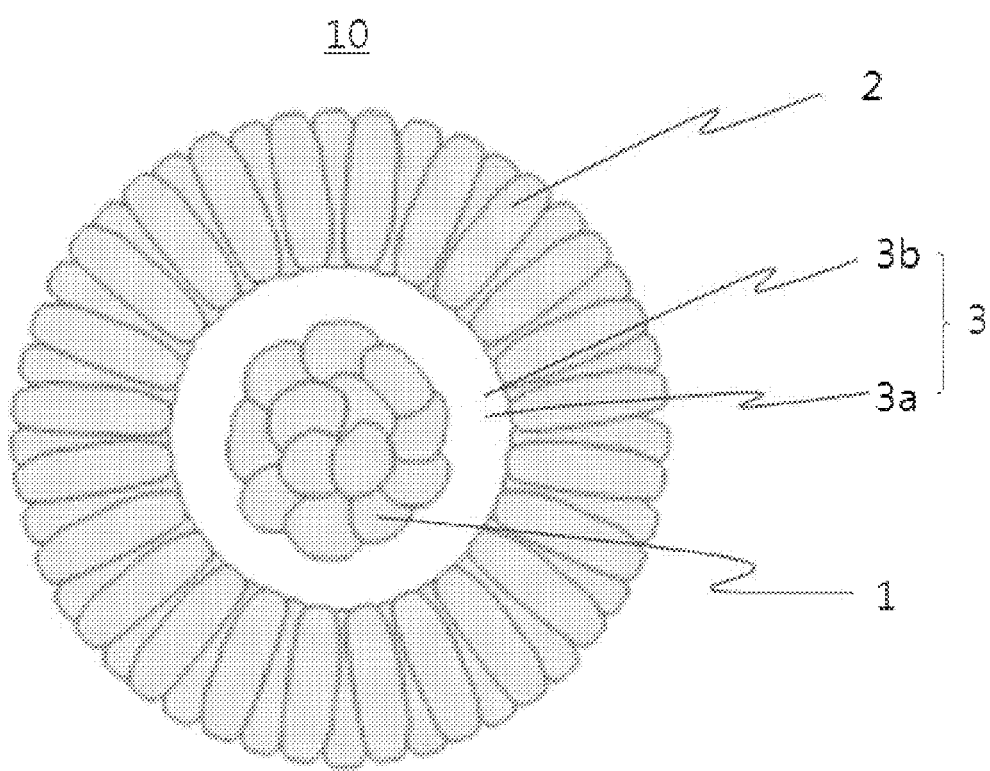
FIG. 1 is a sectional structure diagram schematically showing a positive electrode active material for a lithium secondary battery according to an embodiment of the present invention.

FIG. 1 is a sectional structure diagram schematically showing a positive electrode active material for a lithium secondary battery according to an embodiment of the present invention. FIG. 1 is one example for describing the present invention, and the invention is not limited thereto.

Referring to FIG. 1, a positive electrode active material for a lithium secondary battery (10) according to an embodiment of the present invention includes a core (1), a shell (2) surrounding the core, and a buffer layer (3) located between the core and the shell, wherein the buffer layer (3) includes a pore (3a) and a three-dimensional network structure (3b).

In the positive electrode active material (10), the core (1) specifically includes a lithium complex metal oxide as a compound capable of reversible intercalation and deintercalation of lithium (lithiated intercalation compound) (hereinafter, simply referred to as 'a first lithium complex metal oxide').

In addition, the core (1) may be formed with a single particle of the first lithium complex metal oxide, or may be formed with a secondary particle, an aggregate of the primary particles of the first lithium complex metal oxide. Herein the primary particles may be uniform or non-uniform.

In addition, in the positive electrode active material (10), the shell (2) located surrounding the core includes a lithium complex metal oxide as a compound capable of reversible intercalation and deintercalation of lithium (lithiated intercalation compound) (hereinafter, simply referred to as 'a second lithium complex metal oxide').

Furthermore, the second lithium complex metal oxide may be a crystal orientation particle grown from the center to the surface of the positive electrode active material in a radial form. By the second lithium complex metal oxide particle forming the shell having crystal orientation in a direction facilitating lithium ion intercalation and deintercalation, a higher output property may be obtained compared to active materials having the same composition but without crystal orientation.

Specifically, the second lithium complex metal oxide particle may have various shapes including a polygon such as hexahedron, a cylinder, a fiber shape, a scaly or the like, and more specifically, may have a fiber shape of which length in a major axis direction vertical to the length in a minor axis direction is longer, compared to the length in the minor axis direction passing through the center of the second lithium complex metal oxide particle, specifically, a fiber shape having an aspect ratio of 1.5 or greater. When the second lithium complex metal oxide particle forming the shell has an aspect ratio of less than 1.5, uniform particle growth is not achieved causing concern of electrochemical property decline. Herein, the aspect ratio means a ratio of a length in a major axis direction passing through the center of the second lithium complex metal oxide particle and vertical to a minor axis direction to a length in the minor axis direction passing through the center of the second lithium complex metal oxide particle, that is, a diameter (=length in major axis direction/length in minor axis direction).

In addition, the shell (2) may further include a pore formed between the second lithium complex metal oxide particles. Specifically, the shell (2) may have porosity of 15% by volume or less, or 0.1% by volume to 15% by volume to the total volume of the shell. When the shell porosity is greater than 15% by volume, there is concern of structure stability decline in the shell. In addition, the shell porosity may be measured by particle section analysis using a focused ion beam (FIB) or by mercury intrusion porosimetry.

Meanwhile, between the core (1) and the shell (2) in the positive electrode active material (10), a buffer layer (3) including a pore (3a) and a three-dimensional network structure (3b) which is connecting the core and the shell is located.

The three-dimensional network structure (3b) in the buffer layer (3) is formed from a density difference due to controlling a pH of the reactants in active material preparation while precursor particles including a core and a shell that have different density produce an inner core of the active material through heating, and performs a role of supporting space between the core (1) and the shell (2) by connecting the core and the shell. Accordingly, like the core (1) and the shell (2), the three-dimensional network structure (3b) has a lattice shape in which particles of a lithium complex metal oxide as a compound capable of reversible intercalation and deintercalation of lithium (lithiated intercalation compound) (hereinafter, simply referred to as 'a third lithium complex metal oxide') line up from the core to the shell, or has a tangled cobweb shape.

In addition, in the buffer layer (3), the pore (3a) is formed during a process in which the active material particles are converted to a porous structure by controlling a pH of the reactants in the active material preparation, and may be located within the three-dimensional network structure. The pore forms space between the core (1) and the shell (2), acts as a buffer during rolling for preparing an electrode, and also performs a role of increasing a reaction area with an electrolyte liquid of the active material by allowing the electrolyte liquid readily penetrating inside the active material and thereby reacting with the core.

Such a pore (3a) may be included in 30% by volume or less to the total volume of the positive electrode active material. When the pore is included in the above-mentioned range, excellent buffer action and an effect of increasing a reaction area with the electrolyte liquid may be obtained without decline in the mechanical strength of the active material. Considering the significance in the improvement effect obtained by the pore formation, the pore (3a) may be specifically included in 2% by volume to 30% by volume to the total volume of the positive electrode active material, and more specifically in 5% by volume to 20% by volume. Herein, porosity of the buffer layer may be measured by particle section analysis using a focused ion beam (FIB), or by mercury intrusion porosimetry.

Meanwhile, in the positive electrode active material (10) having a structure such as above, the first to the third lithium complex metal oxides in the core, the shell and the buffer layer are separately defined depending on the location, and may be compounds that are the same as or different from each other. Specifically, the first to the third lithium complex metal oxides are each independently a complex metal oxide of lithium and any one, two or more metal elements selected from the group consisting of cobalt, manganese, nickel and aluminum, and more specific examples thereof may include a lithium-manganese-based oxide (for example, $LiMnO_2$, $LiMn_2O$ and the like), a lithium-cobalt-based oxide (for example, $LiCoO_2$ and the like), a lithium-nickel-based oxide (for example, $LiNiO_2$ and the like), a lithium-nickel-manganese-based oxide (for example, $LiNi_{1-Y}Mn_YO_2$ (herein, $0<Y<1$), $LiMn_{2-Z}Ni_ZO_4$ (herein, $0<Z<2$) and the like), a lithium-nickel-cobalt-based oxide (for example, $LiNi_{1-Y}Co_YO$ (herein, $0<Y<1$) and the like), a lithium-manganese-cobalt-based oxide (for example, $LiCo_{1-Y}Mn_YO_2$ (herein, $0<Y<1$), $LiMn_{2-Z}Co_ZO_4$ (herein, $0<Z<2$) and the like), a lithium-nickel-manganese-cobalt-based oxide (for example, $Li(Ni_PCo_QMn_R)O_2$ such as LiNi$_{0.6}$Mn$_{0.2}$Co$_{0.2}$O$_2$, LiNi$_{0.5}$Mn$_{0.3}$Co$_{0.2}$O$_2$, or LiNi$_{0.8}$Mn$_{0.1}$Co$_{0.1}$O$_2$ (herein, 0<P<1, 0<Q<1, 0<R<1, P+Q+R=1), Li(Ni$_P$Co$_Q$Mn$_R$)O$_4$ (herein, 0<P<2, 0<Q<2, 0<R<2, P+Q+R=2) and the like), or a lithium-nickel-cobalt-metal (M) oxide (for example, LiNi$_{0.8}$Co$_{0.15}$Al$_{0.05}$O$_2$, Li(Ni$_P$Co$_Q$M$_R$)O$_2$ (herein, M is any one, two or more elements selected from the group consisting of Al, Fe, V, Cr, Ti, Ta, Mg, Mo, Zr, W, Sn, Hf, Nd and Gd, and P, Q and R are each independently an atomic fraction of elements with 0<P<1, 0<Q<1, 0<R<1 and P+Q+R=1) and the like), and the like.

In addition, the lithium complex metal oxide may be substituted or doped with any one, two or more elements selected from the group consisting of Zr, Ti, Mg, Ta, Nb, W, Mo and Cr. When the lithium complex metal oxide forming the positive electrode active material is substituted or doped with the above-mentioned elements as above, an output property may be improved by enhancing structural stability of the active material.

More specifically, the first to the third lithium complex metal oxides in the core, the shell and the buffer layer may each independently include a compound of the following Formula 1.

$$Li_aNi_{1-x-y}Co_xM1_yM3_zM2_wO_2 \quad \text{[Formula 1]}$$

In Formula 1, M1 includes any one, two or more elements selected from the group consisting of Al and Mn, M2 includes any one, two or more elements selected from the group consisting of Zr, Ti, Mg, Ta and Nb, and M3 includes any one, two or more elements selected from the group consisting of W, Mo and Cr, and 1.0≤a≤1.5, 0<x≤0.5, 0<y≤0.5, 0≤z≤0.03, 0≤w≤0.02 and 0<x+y≤0.7.

The composition of the lithium complex metal oxide of Formula 1 is an average composition of the total positive electrode active material particles.

In the lithium complex metal oxide of Formula 1, Li may be included in the content corresponding to a, that is, in 1.0≤a≤1.5. When a is less than 1.0, there is concern of a capacity decrease, and when greater than 1.5, the particles are sintered in a baking process making active material preparation difficult. Considering a balance between the significance in the capacity property improving effect of the positive electrode active material obtained by Li content control and sinterability in the active material preparation, the Li may be more specifically included in 1.0≤a≤1.15.

In addition, in the lithium complex metal oxide of Formula 1, Co may be included in the content corresponding to x, that is, in 0<x≤0.5. When x is 0, there is concern of capacity property decline, and when greater than 0.5, there is concern of a cost increase. Considering the significance in the capacity property improving effect obtained by Co inclusion, the Co may be more specifically included in 0.10≤x≤0.35.

Furthermore, in the lithium complex metal oxide of Formula 1, M1 may include at least any one element selected from the group consisting of Al and Mn, and more specifically, may be Al or Mn. M1 may be included in the content corresponding to y, that is, in 0<y≤0.5. When y is 0, an improving effect with M1 inclusion is not obtained, and when greater than 0.5, there is concern that an output property and a capacity property of a battery decline. Considering the significance in the battery property improving effect obtained by M1 element inclusion, M1 may be more specifically included in 0.1≤y≤0.3.

In addition, the lithium complex metal oxide of Formula 1 or Ni, Co and M1 elements in the lithium complex metal oxide may be partially substituted or doped with another element, that is, M2, in order to improve battery properties through controlling distribution of the metal elements in the active material.

M2 may be specifically any one, two or more elements selected from the group consisting of Zr, Ti, Mg, Ta and Nb, and more specifically, may be Zr or Ti. The M2 element may be included in the content corresponding to w, that is, in 0≤w≤0.02 within a range that does not decline positive electrode active material properties.

In addition, in Formula 1, M3 is an element corresponding to group 6 (group VIB) in the periodic table, and may perform a role of suppressing particle growth during a baking process in the active material particle preparation. In the crystal structure of the positive electrode active material, M3 may substitute some of Ni, Co or M1 and present in the sites where these elements are supposed to be present, or may react with lithium to form a lithium oxide. Accordingly, sizes of the crystal grain may be controlled through adjusting the content of M3 and the time of M3 introduction. Specifically, M3 may be any one, two or more elements selected from the group consisting of W, Mo and Cr, and more specifically, at least any one element of W and Cr.

Such M3 may be included in the content corresponding to z in the lithium complex metal oxide of Formula 1, that is, in 0≤z≤0.03. When z is greater than 0.03, the active material satisfying the properties described above is not readily obtained, and as a result, effects of improving output and life properties may be insignificant. Considering the particle structure obtained by controlling the M3 element content and the significance in the battery property improving effect obtained therefrom, the content of the M3 element may be more specifically 0.00055≤z≤0.03 or 0.001≤z≤0.01.

Among these, the lithium complex metal oxide may be 10 more specifically a lithium-nickel-manganese-cobalt-based oxide in which the nickel content in the lithium complex metal oxide is 60% by atom or greater such as LiNi$_{0.6}$Mn$_{0.2}$Co$_{0.2}$O$_2$, in terms that a capacity property and stability of a battery are capable of being enhanced.

Meanwhile, the positive electrode active material having the structure described above may have an average particle diameter (D$_{50}$) of 2 μm to 20 μm considering a specific surface area and positive electrode mix density. When the positive electrode active material has an average particle diameter of less than 2 μm, there is concern that dispersibility in the active material layer may be reduced due to aggregation of the positive electrode active materials, and when the average particle diameter is greater than 20 μm, there is concern that the positive electrode active material may have reduced mechanical strength and a reduced specific surface area. In addition, when considering rate capability and an initial capacity property improving effect due to the specific structure, the positive electrode active material may have an average particle diameter (D$_{50}$) of 3 μm to 20 μm, and more specifically, 3 μm to 15 μm. In the present invention, an average particle diameter (D$_{50}$) of the positive electrode active material may be defined as a particle diameter at the 50% in the particle diameter distribution. In the present invention, an average particle diameter (D$_{50}$) of the positive electrode active material may be measured through, for example, an electron microscopy observation using a scanning electron microscopy (SEM), a field emission scanning electron microscopy (FE-SEM) or the like, or using a laser diffraction method. More specifically, when using a laser diffraction method for the measurement, particles of the positive electrode active material are dispersed into dispersion media, and then introduced to a commercially available laser diffraction particle size analyzer (for example, Microtrac MT 3000) and irradiated with ultrasonic waves of approximately 28 kHz with an output of 60 W, and the average particle diameter ($D_{50}$) at the 50% in the particle diameter distribution in the measuring device may be calculated.

In addition, in the positive electrode active material, a ratio of the core radius to the positive electrode active material radius is greater than 0 and less than 0.4, more specifically from 0.01 to 0.2 and even more specifically from 0.1 to 0.2, and a ratio of the length from the positive electrode active material center to an interface between the buffer layer and the shell to the positive electrode active material radius is greater than 0 and less than 0.7, more specifically from 0.01 to 0.5 and even more specifically from 0.1 to 0.3.

Furthermore, when a ratio of the shell thickness to the positive electrode active material radius is referred to as a shell area in the positive electrode active material, the shell area determined from the following Mathematical Formula 1 may be from 0.2 to 1, more specifically from 0.25 to 0.7, and even more specifically from 0.5 to 0.6.

shell area=(positive electrode active material radius-core radius-buffer layer thickness)/positive electrode active material radius  [Mathematical Formula 1]

In the present invention, the radii of the positive electrode active material and the core, the thickness of the shell, and the particle diameter of the positive electrode active material mean an average value unless particularly stated otherwise.

More specifically, in the positive electrode active material, when the core (1) is a single particle of the first lithium complex metal oxide, the core may have an average particle diameter ($D_{50}$) of 0.2 μm to 10 μm considering a specific surface area of the core reacting with an electrolyte liquid. In addition, when the core is a secondary particle from the aggregation of primary particles, the primary particles may have an average particle diameter of 0.01 μm to 5 μm, and the secondary particles may have an average particle diameter of 0.2 μm to 10 μm.

In the present invention, the average particle diameter ($D_{50}$) of the core and the first lithium complex metal oxide may be defined as a particle diameter at the 50% in the particle diameter distribution. In addition, as the average particle diameter ($D_{50}$) of the core and the first lithium complex metal oxide particles, an average particle diameter ($D_{50}$) at the 50% in the particle diameter distribution may be calculated through, for example, an electron microscopy observation using a scanning electron microscopy (SEM), a field emission scanning electron microscopy (FE-SEM) or the like.

In addition, in the positive electrode active material, the shell (2) may have a thickness of 0.5 μm to 8 μm. When the shell has a thickness of less than 0.5 μm, there is concern that the shell may be broken during rolling in an electrode preparation process, and when the thickness of the shell is greater than 8 μm, there is concern that lithium ion migrating distance becomes long, and resistance increases therefrom.

In the present invention, the shell thickness may be measured through, for example, an electron microscopy observation using a scanning electron microscopy (SEM), a field emission scanning electron microscopy (FE-SEM) or the like.

By forming the core, the buffer layer and the shell in the positive electrode active material in the above-mentioned ratio, an output property and a life property of a secondary battery may be further enhanced by minimizing destruction of the active material caused by a rolling process in electrode preparation, and maximizing reactivity with an electrolyte liquid.

In addition, the positive electrode active material according to an embodiment of the present invention may further include a surface treating layer capable of increasing packing density of the positive electrode active material while enhancing a cycle property by blocking contact between the lithium complex metal oxide particles and an electrolyte liquid on the surface and thereby suppressing a side reaction.

The surface treating layer may include a lithium oxide of the following Formula 2.

$$Li_mMeO_{(m+n)/2}$$ [Formula 2]

(In Formula 2, Me includes any one, two or more elements selected from the group consisting of B, W, Hf, Nb, Ta, Mo, Si, Sn and Zr, 2≤m≤10, and n is an oxidation number of Me)

The lithium oxide of Formula 2 is an average composition of the whole surface treating layer.

More specifically, when Me is B in Formula 2, the lithium oxide may be $LiBO_2$, $Li_2B_4O_7$ or the like, and may include any one, or a mixture of two or more among these. In addition, when Me is W in Formula 2, the lithium oxide may be $Li_2WO_4$, $Li_4WO_5$, $Li_6WO_6$ or the like, and may include any one, or a mixture of two or more among these.

Me included in the lithium oxide of Formula 2 may be included in 100 ppm to 20,000 ppm to the total weight of the positive electrode active material. When the Me content is less than 100 ppm, an improving effect obtained by forming the surface treating layer including a lithium oxide is insignificant, and when the content is greater than 20,000 ppm, there is concern that battery properties may decline due to excess Me.

In the present invention, the amount of lithium and transition metals included in the lithium transition metal included in the surface treating layer may be measured using an inductively coupled plasma-atomic emission spectrometer (ICP-AES), and the form of the lithium complex metal oxide may be identified through a time of flight secondary ion mass spectrometry (ToF-SIMS).

Such a surface treating layer may be formed on the whole core surface, or formed partially. Specifically, when the surface treating layer is partially formed, the surface treating layer may be formed in greater than or equal to 25% and less than 100% to the whole core surface area. When the surface treating layer-formed area is less than 25%, an improving effect obtained by forming the surface treating layer is insignificant.

In addition, in the positive electrode active material according to an embodiment of the present invention, the surface treating layer may be formed in a thickness ratio of 0.001 to 1 to the average particle diameter ($D_{50}$) of the lithium cobalt oxide particles. When the thickness ratio of the surface treating layer to the lithium cobalt oxide particles is less than 0.001, an improving effect obtained by forming the surface treating layer is insignificant, and when the thickness ratio is greater than 1, there is concern that battery properties may decline due to a resistance increase from an increase in the lithium ion migrating distance in the surface treating layer.

The positive electrode active material having the above-mentioned structure according to an embodiment of the present invention may be prepared using a method including preparing a reaction solution in which metal-containing compound particles are produced by adding an ammonium cation-containing complex forming agent and a basic compound to a solution including a metal raw material for forming a lithium complex metal oxide, and coprecipitation reacting the result under pH 10.5 to pH 12 (Step 1); preparing a precursor by adding an ammonium cation-containing complex forming agent and a basic compound to the reaction solution until the reaction solution has a pH of 10.5 or less to grow the metal-containing compound particles at a temperature lower than the temperature at which the metal-containing compound particles are produced (Step 2); and mixing the precursor with a lithium-containing raw material and then heating the result (Step 3). In addition, a raw material including a doping or substituting element (M2 or M3) may be further included when carrying out at least any one process of the preparing of the transition metal-containing solution, and the mixing of the grown precursor and the lithium raw material. Accordingly, the method for preparing the positive electrode active material is provided according to another embodiment of the present invention.

Hereinafter, each of the steps is described in more detail, and Step 1 for preparing the positive electrode active material is a step of preparing metal-containing compound particles.

The metal-containing compound particles may be prepared by adding an ammonium cation-containing complex forming agent and a basic compound to a solution including a metal raw material for forming a lithium complex metal oxide, and coprecipitation reacting the result under pH 10.5 to pH 12.

The solution including a metal raw material for forming a lithium complex metal oxide may be prepared by adding a raw material including metals other than lithium in the first lithium complex metal oxide forming the finally prepared positive electrode active material, and selectively a raw material containing a substituting or doping element (M2 or M3) to a solvent, specifically, water, or a mixture of water and an organic solvent capable of being uniformly mixed with water (specifically, alcohol and the like), or may be used after preparing a solution, specifically an aqueous solution, including each metal-containing raw material, and mixing the result.

As the metal raw material for forming a lithium complex metal oxide, a lithium complex metal oxide forming a target active material, specifically, metals forming the lithium complex metal oxide depending on the composition of the first lithium complex metal oxide, specifically, any one, two or more metal-containing compounds selected from the group consisting of Co, Mn, Ni, Al, Fe, V, Cr, Ti, Ta, Mg, Mo, Zr, W, Sn, Hf, Nd and Gd, specifically, acetates, nitrates, sulfates, halides, hydroxides, oxides or oxyhydroxides and the like, may be used, and the metal raw material is not particularly limited as long as it is soluble in water.

Specifically, when the positive electrode active material includes a lithium-nickel-cobalt-manganese-based compound as the lithium complex metal compound, a nickel-containing raw material, a cobalt-containing raw material and a manganese-containing raw material may be used as the raw material.

In addition, the cobalt raw material may include $Co(OH)_2$, CoOOH, $Co(OCOCH)_2 \cdot 4H_2O$, $Co(NO_3)_2 \cdot 6H_2O$ or $Co(SO_4)_2 \cdot 7H_2O$ and the like, and any one, or a mixture or two or more of these may be used.

The nickel raw material may include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, fatty acid nickel salts or nickel halides, and any one, or a mixture or two or more of these may be used.

The manganese raw material may include manganese oxides such as $Mn_2O_3$, $MnO_2$, and $Mn_3O_4$; manganese salts such as $MnCO_3$, $Mn(NO_3)_2$, $MnSO_4$, manganese acetate, dicarboxylic acid manganese salts, manganese citrate and fatty acid manganese salts; manganese oxyhydroxides, manganese chlorides, and the like, and any one, or a mixture or two or more of these may be used.

The metal raw material for forming a lithium complex metal oxide may be used in a suitable content ratio considering the content of metal elements in the lithium complex metal oxide in the finally prepared positive electrode active material. As one example, when the lithium complex metal oxide is a lithium-nickel-cobalt-manganese-based oxide, the total molar number of the nickel, the cobalt and the manganese may be from 0.5 M to 2.5 M, or from 1 M to 2.2 M. In addition, continuously supplying the metal raw material for forming a lithium complex metal oxide adjusting to the lithium complex metal oxide precipitation rate is preferable so that the concentrations of such metal elements are maintained.

In addition, the ammonium cation-containing complex forming agent may be specifically $NH_4OH$, $(NH_4)_2SO_4$, $NH_4NO_3$, $NH_4Cl$, $CH_3COONH_4$, $NH_4CO_3$ or the like, and these may be used either alone as one type, or as a mixture of two or more types. Furthermore, the ammonium cation-containing complex forming agent may be used in the form of an aqueous solution, and herein, the solvent may use water, or a mixture of water and an organic solvent capable of being uniformly mixed with water (specifically, alcohol and the like).

The ammonium cation-containing complex forming agent may be added in an amount to have a molar ratio of 0.5 to 1 to 1 mole of the solution including the metal raw material for forming a lithium complex metal oxide. An ammonium cation-containing complex forming agent generally reacts with metals in a molar ratio of 1:1 or greater to form a complex, however, unreacted complexes of the formed complexes not reacting with the basic aqueous solution are turned into an intermediate product, and may be collected and reused as the ammonium cation-containing complex forming agent, and therefore, the chelating amount used may decrease in the present invention compared to common practices. As a result, the positive electrode active material may have increased crystallinity, and stabilized.

In addition, the basic compound may be alkali metal or alkali-earth metal hydroxides such as NaOH, KOH or $Ca(OH)_2$, or hydrates thereof, and these may be used either alone as one type, or as a mixture of two or more types. The basic compound may also be used in the form of an aqueous solution, and herein, the solvent may use water, or a mixture of water and an organic solvent capable of being uniformly mixed with water (specifically, alcohol and the like).

In addition, the coprecipitation reaction for forming the metal-containing compound particles may be carried out under a condition that a solution including the metal raw material for forming a lithium complex metal oxide has a pH of 10.5 to 12. When the pH is outside the above-mentioned range, there is concern that changes in the size of the prepared positive electrode active material precursor occur, or particle clevage is induced. There is also concern that metal ions are eluted on the surface of the positive electrode active material precursor causing the formation of various oxides due to side reactions. More specifically, the coprecipitation reaction may be carried out under a condition that the solution containing the metal raw material for forming a lithium complex metal oxide has a pH of 11 to 12. In addition, the ammonium cation-containing complex forming agent and the basic compound may be used in a molar ratio of 1:10 to 1:2 in order to satisfy the above-mentioned pH range. Herein, the pH value means a pH value at a liquid temperature of 25° C.

In addition, the coprecipitation reaction may be carried out under inert atmosphere such as nitrogen or argon atmosphere, and at a temperature of 30° C. to 70° C., more specifically, at a temperature of 40° C. to 60° C. A stirring process may also be selectively carried out in order to increase a reaction rate during the reaction, and the stirring rate herein may be from 100 rpm to 2000 rpm.

Through such a process, metal-containing compound particles are produced and precipitated in the reaction solution. Specifically, when the lithium complex metal oxide in the finally prepared positive electrode active material is the compound of Formula 1, the metal-containing compound may include a compound of the following Formula 3.

 [Formula 3]

(In Formula 3, M1, M2, M3, x, y, z and w are the same as those defined above, and Z is a hydroxyl group (OH) or an oxyhydroxyl group (OOH))

The metal-containing compound precipitated as a result of the above-mentioned reaction is separated using common methods, and then a drying process may be selectively carried out.

The drying process may be carried out using common drying methods, and specifically, may be carried out for 15 hours to 30 hours using a method such as heating treatment and hot air injection in a temperature range of 100° C. to 200° C.

Next, Step 2 in the preparation method for preparing the positive electrode active material is a process for preparing a precursor of the positive electrode active material by growing the metal-containing compound particles prepared in Step 1.

Specifically, the metal-containing compound particles may grow by adding an ammonium cation-containing complex forming agent and a basic compound to the reaction solution in which the metal-containing compound particles are produced until the reaction solution has a pH lower than the reaction solution in the coprecipitation reaction, that is, in the step of producing the metal-containing compound particles in Step 1. More specifically, Step 1 may be carried out under pH 10.5 or less that is lower than the pH in Step 2, and more specifically, in a range of pH 8 to 10.5.

The growth of the metal-containing compound particles may be carried out while changing the reactant pH with a rate of pH 1 to 2.5 per hour. By carrying the reaction under a pH lower than the coprecipitation reaction with such a pH change rate, target particle structures may be readily formed.

The growth of the metal-containing compound particles may be carried out at a temperature lower than the temperature in the step of producing the metal-containing compound particles in Step 1, and specifically, may be carried out at a temperature lower by 5° C. to 20° C. than the reaction temperature in Step 1. By carrying out the reaction at such a low temperature, the growth rate of the particles is controlled, and target particle structures may be readily formed.

In addition, when introducing the ammonium cation-containing complex forming agent and the basic compound to the reaction solution in which the metal-containing compound particles are produced, they may be introduced at the same rate, or may be introduced while continuously reducing the rate of introduction. When the ammonium cation-containing complex forming agent and the basic compound are introduced while reducing the rate of introduction, they may be introduced while reducing the rate of introduction with a reduction rate of greater than or equal to 20% and less than 100%.

By controlling the rate of introduction and the concentration of the ammonium cation-containing complex forming agent and the basic compound, and the reaction temperature as above, the precipitation rate of the metal-containing compound in the particle growth step may be faster than the precipitation rate of the metal-containing compound in Step 1. As a result, density of the outer surface vicinity of the metal-containing compound particles becomes low, which may readily induce the direction of particle growth during the heat treatment process afterword.

In addition, the process of Step 2 may be carried out under inert atmosphere.

After the process of Step 2, the grown metal-containing compound particles, that is, a precursor, are separated from the reaction solution, and then processes of washing and drying may be selectively further carried out.

The drying process may be carried out using common drying methods, and specifically, may be carried out using a method such as heating treatment and hot air injection in a temperature range of 100° C. to 120° C.

From the process such as Step 2, a precursor having a core-shell structure including a core including a first lithium complex metal oxide; and a shell including a fiber-shaped second lithium complex metal oxide grown on the core is prepared. Herein, the core and the shell may have different density through the pH control of the reaction solution.

Step 3 is a step of preparing a positive electrode active material having a core-shell-formed structure by mixing the precursor prepared in Step 2 with a lithium-containing raw material, heat treating the result, and providing a buffer layer in between.

The lithium raw material may include lithium-containing carbonates (for example, lithium carbonate and the like), hydrates (for example, lithium hydroxide monohydrate ($LiOH \cdot H_2O$) and the like), hydroxides (for example, lithium hydroxide and the like), nitrates (for example, lithium nitrate ($LiNO_3$) and the like), chlorides (for example, lithium chloride (LiCl) and the like), and the like, and these may be used either alone as one type, or as a mixture of two or more types. In addition, the amount of the lithium-containing raw material used may be determined depending on the lithium and transition metal content in the finally prepared lithium complex metal oxide, and specifically, may be used in an amount that the molar ratio of the lithium included in the lithium raw material and the metal element (Me) included in the precursor (molar ratio of lithium/metal element (Me)) becomes 1.0 or higher.

In addition, a sintering additive may be selectively further added when mixing the precursor and the lithium-containing raw material.

By adding the sintering additive, crystals are readily grown at a low temperature, and a non-uniform reaction may be minimized in the dry mixing. The sintering additive is also effective in making edge parts of the primary particle of the lithium complex metal oxide rounded to form the particle in a round curved form. In a general lithium oxide-based positive electrode active material including manganese, manganese elution frequently occurs from particle edges, and secondary battery properties, particularly, a life property at high temperatures, decline due to such manganese elution. By using the sintering additive, the area of manganese elution may decrease by rounding off the edge of the primary particle, and as a result, stability and a life property of a secondary battery may be enhanced.

Specifically, the sintering additive may include boron compounds such as boric acid, lithium tetraborate, boron oxide and ammonium borate; cobalt compounds such as cobalt oxide (II), cobalt oxide (III), cobalt oxide (IV) and tricobalt tetroxide; vanadium compounds such as vanadium oxide; lanthanum compounds such as lanthanum oxide; zirconium compounds such as zirconium diboride, calcium zirconium silicate and zirconium oxide; yttrium compounds such as yttrium oxide; or gallium compounds such as gallium oxide, or the like, and any one, or a mixture of two or more of these may be used.

The sintering additive may be used in an amount of 0.2 parts by weight to 2 parts by weight, and more preferably, in 0.4 parts by weight to 1.4 parts by weight to the total weight of the precursor.

In addition, a moisture scavenger may be selectively further added when mixing the precursor and the lithium-containing raw material.

Specifically, the moisture scavenger may include citric acid, tartaric acid, glycolic acid, maleic acid or the like, and any one, or a mixture of two or more of these may be used. The moisture scavenger may be used in 0.01 parts by weight to 2 parts by weight to the total weight of the precursor.

In addition, the heat treatment process for the mixture of the metal-containing compound particles and the lithium-containing raw material may be carried out under air atmosphere or oxidizing atmosphere (for example, $O_2$ and the like), and more specifically, may be carried out under oxidizing atmosphere.

The heat treatment process may be carried out at 700° C. to 1000° C., or at 800° C. to 900° C. In addition, the heat treatment process may be carried out for 5 hours to 48 hours, or 10 hours to 20 hours under the above-mentioned temperature condition. When the heat treatment temperature is less than 700° C. or the heat treatment time is for less than 5 hours, crystal growth during the heat treatment may be insufficient, and when the heat treatment temperature is higher than 1000° C., or the heat treatment time is for longer than 20 hours, crystals grow too much, which is not preferable.

In addition, the heat treatment process may be carried out in multisteps of two steps or three steps adding a low temperature baking process for concentration gradient and maintaining the particle orientation. Specifically, the heat treatment process may be carried out in the manner maintaining for 5 hours to 15 hours at 250° C. to 450° C., 5 hours to 15 hours at 450° C. to 600° C., and 5 hours to 15 hours at 700° C. to 900° C.

In the metal-containing compound particles produced and grown through Step 1 and Step 2, crystals inside the particles and crystals outside the particles formed by particle growth thereafter have different properties due to differences in the process condition during the preparation process, that is, differences in the pH, the temperature and the like. In other words, inside crystals made when the pH is high shrink during the heat treatment process as above, and crystals made when the pH and the temperature are low grow. As a result, the shrunk crystals form the core, and the crystals grown outside form the shell, and from such formation of the core and the shell, a pore is formed between the core and the shell, and the crystals located between the core and the shell form a three-dimensional network structure connecting inside and outside of the particle. In addition, the outside crystals of the particles grow from the center of the particles to the outside in a radial form, and crystal orientation is obtained.

Meanwhile, when the positive electrode active material further includes a surface treating layer on the surface, a process of forming the surface treating layer for the prepared positive electrode active material may be further carried out.

Specifically, the surface treating layer may be formed by carrying out surface treatment for the core prepared in Step 1 using a composition including the lithium oxide of Formula 2, or mixing the core with a Me raw material and then heat treating the result.

First, when the surface treatment is carried out using a composition of the lithium oxide of Formula 2, the surface treatment may be carried out by surface treating a composition prepared by dispersing the lithium oxide of Formula 2 into a solvent on the core using common slurry coating methods such as application, immersion and spray, and then heat treating the result. The lithium oxide is the same as that described above.

In addition, as the solvent capable of being used in the preparation of the composition, water or alcohol having 1 to 8 carbon atoms (for example, methanol, ethanol or isopropyl alcohol and the like), or polar organic solvents such as dimethyl sulfoxide (DMSO), N-methylpyrrolidone (NMP) and acetone, and any one, or a mixture of two or more of these may be used. The solvent may exhibit suitable applicability when surface treating with the composition, and may be included in an amount capable of being readily removed after the heat treatment.

The heat treatment after the surface treatment may be carried out in a temperature range capable of removing the solvent used in the composition. Specifically, the heat treatment may be carried out at 100° C. to 250° C. When the temperature is less than 100° C. in the heat treatment, a side reaction caused by the residual solvent component occurs causing concern for battery performance decline, and when the temperature is higher than 250° C., there is concern that a side reaction caused by high temperature heat may occur.

When mixing the core with a Me raw material and heat treating the result as in another method, an Me-including acetates, nitrates, sulfates, halides, sulfides, hydroxides, oxides or oxyhydroxides and the like may be used as the Me raw material. As one example, when the Me is B, boric acid, lithium tetraborate, boron oxide, ammonium borate and the like may be included, and any one, or a mixture of two or more of these may be used. In addition, when the Me is tungsten, tungsten oxide (VI) and the like may be included.

The heat treatment after mixing the core and the Me raw material may be carried out at 300° C. to 1200° C. When the heat treatment temperature is less than 300° C., the lithium oxide of Formula 2 is not readily formed, and when higher than 1200° C., a side reaction material may be produced due to excessive sintering.

The atmosphere during the heat treatment is not particularly limited, and the heat treatment may be carried out under vacuum, inert or atmospheric atmosphere.

The positive electrode active material prepared according to the above-mentioned preparation method controls pHs, concentrations and rates of the reactants, and includes a pore-including buffer layer between the core and the shell, and therefore, minimizes destruction of the active material caused by rolling in an electrode preparation process, maximizes reactivity with an electrolyte liquid, and reduces resistance of a lithium secondary battery by the particles that form the shell having a crystal structure with orientation facilitating lithium ion intercalation and deintercalation, and as a result, an output property and a life property of the lithium secondary battery is capable of being enhanced.

Still another embodiment of the present invention provides a positive electrode and a lithium secondary battery including the positive electrode active material.

Specifically, the positive electrode includes a positive electrode current collector and a positive electrode active material layer formed on the positive electrode current collector and including the positive electrode active material.

The positive electrode current collector is not particularly limited as long as it has high conductivity without inducing chemical changes in a battery, and examples thereof may include stainless steel, aluminum, nickel, titanium, baked carbon, or aluminum or stainless steel of which surface is treated with carbon, nickel, titanium, silver or the like. In addition, the positive electrode current collector may normally have a thickness of 3 μm to 500 μm, or may increase adhesion of the positive electrode active material by forming a fine convexo-concave on the current collector surface. For example, various forms such as films, sheets, foil, nets, porous materials, foams and non-woven fabrics may be used.

In addition, the positive electrode active material layer may include a conductor and a binder together with the positive electrode active material described above.

Herein, the conductor is used for providing conductivity to the electrode, and may be used without limit as long as it has electron conductivity without causing chemical changes in a battery assembled. Specific examples thereof may include graphite such as natural graphite or artificial graphite; carbon-based materials such as carbon black, acetylene black, Ketjen black, channel black, furnace black, lamp black, thermal black or carbon fiber; metal powder or metal fiber such as copper, nickel, aluminum or silver; needle-shaped or branch-shaped conductive whiskers such as a zinc oxide whisker, a calcium carbonate whisker, a titanium dioxide whisker, a silicon oxide whisker, a silicon carbide whisker, an aluminum borate whisker, a magnesium borate whisker, a potassium titanate whisker, a silicon nitride whisker, or an alumina whisker; conductive metal oxides such as titanium oxide; or conductive polymers such as polyphenylene derivatives, and the like, and these may be used either alone as one type, or as a mixture of two or more types. The conductor may be included normally in 1% by weight to 30% by weight to the total weight of the positive electrode active material layer.

In addition, the binder performs a role of attaching positive electrode active material particles to each other and enhancing adhesion of the positive electrode active material and the current collector. Specific example thereof may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, EPDM rubber (ethylene-propylene-diene monomer rubber), sulfonated-EPDM rubber, styrene-butadiene rubber, fluorine rubber or various copolymers thereof, and these may be used either alone as one type, or as a mixture of two or more types. The binder may be included in 1% by weight to 30% by weight to the total weight of the positive electrode active material layer.

The positive electrode may be prepared using common positive electrode preparation methods except that the above-mentioned positive electrode active material is used. Specifically, the positive electrode may be prepared by applying a composition for forming a positive electrode active material layer prepared by dissolving the positive electrode active material, and selectively the binder and the conductor in a solvent on the positive electrode current collector, and then drying and rolling the result. Herein, the types and the content of the positive electrode active material, the binder and the conductor are the same as those described above.

In addition, the solvent may be a solvent generally used in the art, and may include dimethyl sulfoxide (DMSO), isopropyl alcohol, N-methylpyrrolidone (NMP), acetone, water or the like, and these may be used either alone as one type, or as a mixture of two or more types. The amount of the solvent used is sufficient when the solvent is capable of dissolving or dispersing the positive electrode active material, the conductor and the binder, and allows enough viscosity to obtain excellent thickness uniformity during the application for preparing the positive electrode thereafter, considering the application thickness of slurry and a preparation yield.

As another method, the positive electrode may also be prepared by casting the positive electrode active material composition on a separate support, and then laminating a film obtained from peel-off from this support on the positive electrode current collector.

Another embodiment of the present invention provides an electrochemical device including the positive electrode. The electrochemical device may be specifically a battery, a capacitor and the like, and more specifically, may be a lithium secondary battery.

The lithium secondary battery specifically includes a positive electrode, a negative electrode located opposite to the positive electrode, a separator provided between the positive electrode and the negative electrode and a non-aqueous electrolyte liquid, and the positive electrode is the same as that described above. In addition, the lithium secondary battery may selectively further include a battery container storing an electrode assembly of the positive electrode, the negative electrode and the separator, and a sealing member sealing the battery container.

In the lithium secondary battery, the negative electrode includes a negative electrode current collector and a negative electrode active material layer located on the negative electrode current collector.

The negative electrode current collector is not particularly limited as long as it has high conductivity without inducing chemical changes in a battery, and examples thereof may include copper, stainless steel, aluminum, nickel, titanium, baked carbon, or copper or stainless steel of which surface is treated with carbon, nickel, titanium, silver or the like, aluminum-cadmium alloys, and the like. In addition, the negative electrode current collector may normally have a thickness of 3 μm to 500 μm, and like the positive electrode current collector, may increase adhesion of the negative electrode active material by forming a fine convexo-concave on the current collector surface. For example, various forms such as films, sheets, foil, nets, porous materials, foams and non-woven fabrics may be used.

The negative electrode active material layer selectively includes a binder and a conductor together with the negative electrode active material. As one example, the negative electrode active material layer may be prepared by applying a composition for forming a negative electrode including the negative electrode active material, and selectively the binder and the conductor on the negative electrode current collector and drying the result, or casting the composition for a negative electrode on a separate support, and then laminating a film obtained from peel-off from this support on the negative electrode current collector.

The negative electrode active material may use a compound capable of reversible intercalation and deintercalation of lithium. Specific examples thereof may include carbon materials such as artificial graphite, natural graphite, graphitized carbon fiber and amorphous carbon; metal compounds capable of alloying with lithium such as Si, Al, Sn, Pb, Zn, Bi, In, Mg, Ga, Cd, Si alloys, Sn alloys or Al alloys; metal oxides capable of doping and dedoping lithium such as $SiO_x$ ($0<x<2$), $SnO_2$, vanadium oxides and lithium vanadium oxides; or complexes including the metal compound and the carbon compound such as Si—C complexes or Sn—C complexes, and any one, or a mixture of two or more of these may be used. In addition, a metal lithium thin film may be used as the negative electrode active material. Furthermore, a carbon material may use both low crystalline carbon and high crystalline carbon. Low crystalline carbon typically includes soft carbon and hard carbon, and high crystalline carbon typically includes amorphous, platy, scaly, spherical or fiber-shaped natural graphite or artificial graphite, and high-temperature baked carbon such as Kish graphite, pyrolytic carbon, mesophase pitch based carbon fiber, mesocarbon microbeads, mesophase pitches, and petroleum or coal tar pitch derived cokes.

In addition, the binder and the conductor may be the same as those described above in the positive electrode.

Meanwhile, in the lithium secondary battery, the separator separates a negative electrode and a positive electrode, and provides an ion channel for lithium ions, and is not particularly limited as long as it is commonly used as a separator in lithium secondary batteries. Particularly, a separator having low resistance for electrolyte ion migration and having excellent electrolyte liquid moisture containing ability is preferable. Specifically, a porous polymer film, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer, or a laminate structure of two or more layers of these may be used. In addition, common porous non-woven fabrics, for example, non-woven fabrics made of high melting point glass fiber or polyethylene terephthalate fiber may be used. Furthermore, a coated separator including a ceramic component or a polymer material may also be used in order to secure heat resistance and mechanical strength, and may be used in a monolayer or multilayer structure selectively.

In addition, the electrolyte used in the present invention may include an organic-based liquid electrolyte, an inorganic-based liquid electrolyte, a solid polymer electrolyte, a gel-type polymer electrolyte, a solid inorganic electrolyte, a melting inorganic electrolyte and the like capable of being used in lithium secondary battery preparation, but is not limited thereto.

Specifically, the electrolyte may include an organic solvent and a lithium salt.

The organic solvent may be used without particular limit as long as it is capable of performing a role of a medium through which ions involved in an electrochemical reaction of a battery are capable of migrating. Specific examples of the solvent may include ester-based solvents such as methyl acetate, ethyl acetate, γ-butyrolactone or ε-caprolactone; ether-based solvents such as dibutyl ether or tetrahydrofuran; ketone-based solvents such as cyclohexanone; aromatic hydrocarbon-based solvents such as benzene or fluorobenzene; carbonate-based solvents such as dimethyl carbonate (DMC), diethyl carbonate (DEC), methylethyl carbonate (MEC), ethylmethyl carbonate (EMC), ethylene carbonate (EC) or propylene carbonate (PC); alcohol-based solvents such as ethyl alcohol or isopropyl alcohol; nitriles such as R—CN (R is a linear, branched or cyclic hydrocarbon group of C2 to C20, and may include a double bond aromatic ring or ether bond); amides such as dimethylformamide; dioxolanes such as 1,3-dioxolane; sulfolanes, or the like. Among these, carbonate-based solvents are preferable, and a mixture of a cyclic carbonate (for example, ethylene carbonate, propylene carbonate or the like) having high ion conductivity and a high dielectric constant capable of enhancing charge and discharge performance of a battery, and a low viscous linear carbonate-based compound (for example, ethylmethyl carbonate, dimethyl carbonate, diethyl carbonate or the like) is more preferable. In this case, mixing the cyclic carbonate and the linear carbonate in a volume ratio of approximately 1:1 to 1:9 may result in excellent electrolyte liquid performance.

The lithium salt may be used without particular limit as long as it is a compound capable of providing lithium ions in a lithium secondary battery. Specific examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ or the like. The lithium salt is favorably used in a concentration range of 0.1 M to 2.0 M. When the lithium salt concentration is included in the above-mentioned range, the electrolyte has suitable conductivity and viscosity, thereby is capable of exhibiting excellent electrolyte performance, and lithium ions are capable of effectively migrating.

In the electrolyte, one or more types of additives including, for example, a haloalkylene carbonate-based compound such as difluoroethylene carbonate, pyridine, triethylphosphite, triethanolamine, cyclic ether, ethylenediamine, n-glyme, hexaphosphate triamide, nitrobenzene derivatives, sulfur, quinone imine dye, N-substituted oxazolidinone, N,N-substituted imidazolidine, ethylene glycol dialkyl ether, ammonium salts, pyrrole, 2-methoxyethanol or aluminum trichloride may be further included in addition to the electrolyte forming components with purposes of enhancing a battery life property, suppressing battery capacity decline, enhancing battery discharge capacity and the like. Herein, the additive may be included in 0.1% by weight to 5% by weight to the total weight of the electrolyte.

A lithium secondary battery including the positive electrode active material according to the present invention as above stably exhibits excellent discharge capacity, output property and capacity retention rate, therefore, is used in the field of portable devices such as mobile phones, laptop computers and digital cameras, and the field of electric vehicles such as hybrid electric vehicles (HEV), and the like.

Another embodiment of the present invention provides a battery module including the lithium secondary battery as a unit cell, and a battery pack including the battery module.

The battery module or the battery pack may be used as a power supply of a medium to large sized device of any one or more of power tools; electric vehicles including electric vehicles (EV), hybrid electric vehicles and plug-in hybrid electric vehicle (PHEV); or systems for power storage.

Another embodiment of the present invention provides a method for preparing a precursor useful for preparing the positive electrode active material, and a precursor manufactured using the same.

As described above in the method for preparing the positive electrode active material, a precursor may be prepared using a method including preparing a reaction solution in which metal-containing compound particles are produced by adding an ammonium cation-containing complex forming agent and a basic compound to a solution including a metal raw material for forming a lithium complex metal oxide, and coprecipitation reacting the result under pH 10.5 to pH 12; and growing the metal-containing compound particles by adding an ammonium cation-containing complex forming agent and a basic compound to the reaction solution until the reaction solution has a pH of 10.5 or less at a temperature lower than the temperature at which the metal-containing compound particles are produced. Herein, when the lithium complex metal oxide forming the finally prepared positive electrode active material is substituted or doped, a raw material including a substituting or doping element (M2 or M3) may be further included during the preparing of the reaction solution in the precursor preparation process.

In the precursor preparation method, methods of carrying out each step are the same as those described above, and therefore, detailed description will not be repeated.

In addition, a precursor prepared using the above-mentioned preparation method has a core-shell structure including a core; and a shell located on a surface of the core, and the shell may have lower density than the core through controlling a temperature and a pH in the preparation process.

Furthermore, the core and the shell in the precursor each independently include a metal-containing compound, and herein, the metal may include any one, two or more elements selected from the group consisting of Co, Mn, Ni, Al, Fe, V, Cr, Ti, Ta, Mg, Mo, Zr, W, Sn, Hf, Nd and Gd. More specifically, the metal-containing compounds forming the core and the shell may each independently include a compound of the following Formula 3.

$$Ni_{1-x-y}Co_xM1_yM3_zM2_wZ \qquad \text{[Formula 3]}$$

(In Formula 3, M1, M2, M3, x, y, z and w are the same as those defined above, and Z is a hydroxyl group or an oxyhydroxyl group)

In addition, in the precursor, the metal-containing compound particles forming the shell may have an aspect ratio of greater than 1 such as a needle shape or a fiber shape, and specifically, have a fiber-shaped form having with an aspect ratio 1.5 or greater, and the metal-containing compound particles forming the shell may have crystal orientation oriented from the center to the surface of the precursor in a radial form.

The precursor may have an average particle diameter ($D_{50}$) of 3 μm to 20 μm considering a specific surface area and positive electrode mix density of the finally prepared positive electrode active material. When the precursor has an average particle diameter ($D_{50}$) of less than 3 μm, there is concern that aggregation between the precursors may occur, and when the diameter is greater than 20 μm, there is concern that the precursor may have reduced mechanical strength and a reduced specific surface area. In addition, when considering a rate property of the positive electrode active material due to the specific structure and an initial capacity property improving effect, the precursor may have an average particle diameter ($D_{50}$) of 3 μm to 15 μm.

In the present invention, an average particle diameter ($D_{50}$) of the precursor may be defined as a particle diameter at the 50% in the particle diameter distribution. An average particle diameter ($D_{50}$) of the precursor particles may be measured using a laser diffraction method, and more specifically, particles of the precursor are dispersed into dispersion media, and then introduced to a commercially available laser diffraction particle size analyzer (for example, Microtrac MT 3000) and irradiated with ultrasonic waves of approximately 28 kHz with an output of 60 W, and the average particle diameter ($D_{50}$) at the 50% in the particle diameter distribution in the measuring device may be calculated.

In addition, in the precursor, the core may be a secondary particle in which primary particles of the metal-containing compound aggregate. Furthermore, in the precursor, a ratio of the core radius to the precursor particle radius is greater than 0 and less than 0.5, more specifically from 0.01 to 0.4, and even more specifically from 0.1 to 0.2.

In addition, in the precursor, when a ratio of the shell thickness to the precursor radius is referred to as a shell area, the shell area determined from the following Mathematical Formula 2 may be from 0.2 to 1, more specifically from 0.25 to 0.7, and even more specifically from 0.5 to 0.6.

Shell area=(precursor radius−core radius)/precursor radius    [Mathematical Formula 2]

In the present invention, the radii of the precursor and the core, the thickness of the shell and the particle diameter of the precursor mean an average value unless particularly stated otherwise.

When the core and the shell are formed in the precursor in the ratio as above, and a metal element concentration gradient is formed in each area, distribution of nickel, cobalt and manganese in the active material particle is more optimized and controlled, and as a result, an output property and a life property of a lithium secondary battery may be further enhanced by minimizing destruction of the active material caused by a rolling process in electrode preparation, and maximizing reactivity with an electrolyte liquid.

In the present invention, a particle diameter of the core part may be measured through particle section analysis using a forced ion beam (FIB).

Hereinafter, the present invention will be described in detail with reference to examples for those skilled in the art to readily carry out the invention. However, the present invention may be carried out in various different forms and is not limited to the examples described below.

EXAMPLE 1: PREPARATION OF POSITIVE ELECTRODE ACTIVE Material

In a batch-type 4 L reactor set at 60° C., nickel sulfate, cobalt sulfate and manganese sulfate were each added in water so that a lithium complex metal oxide forming a positive electrode active material has a composition of $LiNi_{0.6}Mn_{0.2}Co_{0.2}O_2$, and an aqueous solution containing a metal raw material for forming a lithium complex metal oxide was prepared. Herein, connection was made so that the aqueous solution was introduced to the reactor with the total concentration of the metal raw material being 2 M in the aqueous solution. In addition, a 4 M NaOH solution, and a NH₄OH aqueous solution with 7% concentration were prepared and each connected to the reactor.

After introducing 3 liters of deionized water in a coprecipitation reactor (capacity 5 L), dissolved oxygen in the water was removed by purging the reactor with nitrogen gas at a rate of 2 liters/minute, and non-oxidizing atmosphere was created inside the reactor. NH₄OH and NaOH were added to the aqueous solution in a molar ratio of 1:10 so that the pH of the aqueous solution became pH 12. After that, the reaction temperature was lowered to 45° C., and NH₄OH and NaOH were each added at a rate of 160 ml/hr while continuously reducing the amounts so that the pH of the aqueous solution was slowly lowered down to pH 10.5 with a rate of pH 2 per hour to form and grow metal-containing hydroxide particles.

The metal-containing hydroxide particles formed as a result, that is, a precursor, were separated, washed and dried in an oven at 120° C. The prepared precursor was mixed with lithium hydroxide as a lithium raw material in a molar ratio of 1:1.07, and the result was heat treated for 15 hours at 850° C. to prepare a positive electrode active material.

EXAMPLE 2: PREPARATION OF POSITIVE ELECTRODE ACTIVE MATERIAL

In a batch-type 4 L reactor set at 60° C., nickel sulfate, cobalt sulfate and aluminum sulfate were each added in water so that a lithium complex metal oxide forming a positive electrode active material has a composition of $LiNi_{0.8}Al_{0.05}Co_{0.15}O_2$, and an aqueous solution containing a metal raw material for forming a lithium complex metal oxide was prepared. Herein, connection was made so that the aqueous solution was introduced to the reactor with the total concentration of the metal raw material being 2 M in the aqueous solution. In addition, a 4 M NaOH solution, and a $NH_4OH$ aqueous solution with 7% concentration were prepared and each connected to the reactor.

After introducing 3 liters of deionized water in a coprecipitation reactor (capacity 5 L), dissolved oxygen in the water was removed by purging the reactor with nitrogen gas at a rate of 2 liters/minute, and non-oxidizing atmosphere was created inside the reactor. $NH_4OH$ and NaOH were added to the aqueous solution in a molar ratio of 1:10 so that the pH of the aqueous solution became pH 12. After that, the reaction temperature was lowered to 45° C., and $NH_4OH$ and NaOH were each added at a rate of 160 ml/hr while continuously reducing the amounts so that the pH of the aqueous solution was slowly lowered down to pH 10.5 with a rate of pH 2 per hour to form and grow metal-containing hydroxide particles.

The metal-containing hydroxide particles formed as a result, that is, a precursor, were separated, washed and dried in an oven at 120° C. The prepared precursor was mixed with lithium hydroxide as a lithium raw material in a molar ratio of 1:1.07, and the result was heat treated for 15 hours at 850° C. to prepare a positive electrode active material.

EXAMPLE 3: PREPARATION OF POSITIVE ELECTRODE ACTIVE MATERIAL

In a batch-type 4 L reactor set at 60° C., nickel sulfate, cobalt sulfate, manganese sulfate and sodium tungstate dihydrate were each added in water so that a lithium complex metal oxide forming a positive electrode active material has a composition of $LiNi_{0.6}Mn_{0.2}Co_{0.2}W_{0.01}O_2$, and an aqueous solution containing a metal raw material for forming a lithium complex metal oxide was prepared. Herein, connection was made so that the aqueous solution was introduced to the reactor with the total concentration of the metal raw material being 2 M in the aqueous solution. In addition, a 4 M NaOH solution, and a $NH_4OH$ aqueous solution with 7% concentration were prepared and each connected to the reactor.

After introducing 3 liters of deionized water in a coprecipitation reactor (capacity 5 L), dissolved oxygen in the water was removed by purging the reactor with nitrogen gas at a rate of 2 liters/minute, and non-oxidizing atmosphere was created inside the reactor. $NH_4OH$ and NaOH were added to the aqueous solution in a molar ratio of 1:10 so that the pH of the aqueous solution became pH 12. After that, the reaction temperature was lowered to 45° C., and $NH_4OH$ and NaOH were each added at a rate of 160 ml/hr while continuously reducing the amounts so that the pH of the aqueous solution was slowly lowered down to pH 10.5 with a rate of pH 2 per hour to form and grow metal-containing hydroxide particles.

The metal-containing hydroxide particles formed as a result, that is, a precursor, were separated, flushed and dried in an oven at 120° C. The prepared precursor was mixed with lithium hydroxide as a lithium raw material in a molar ratio of 1:1.07, and the result was heat treated for 15 hours at 850° C. to prepare a positive electrode active material.

EXAMPLE 4: PREPARATION OF POSITIVE ELECTRODE ACTIVE MATERIAL 0.1 parts by weight of $H_3BO_3$ was mixed to 100 parts by weight of the positive electrode active material prepared in Example 1 using a dry mixer (CYCLOMIX, HOSOKAWA Micron Corporation), and the result was heat treated for 1 hour at 350° C. under atmospheric atmosphere. Using the method, a positive electrode active material in which a surface treating layer including $LiBO_2$ and $Li_2B_4O_7$ was formed on the core surface was prepared (thickness of surface treating layer: 150 nm).

COMPARATIVE EXAMPLE 1: PREPARATION OF POSITIVE ELECTRODE ACTIVE MATERIAL

In a batch-type 4 L reactor set at 60° C., nickel sulfate, cobalt sulfate and manganese sulfate were each added in water so that a lithium complex metal oxide forming a positive electrode active material has a composition of $LiNi_{0.6}Mn_{0.2}Co_{0.2}O_2$, and an aqueous solution containing a metal raw material for forming a lithium complex metal oxide was prepared, and in the solution, the concentration of the metal raw material for forming a lithium complex metal oxide was employed to be 2 M. $NH_4OH$ and NaOH were added to the aqueous solution in a molar ratio of 1:10 so that the pH of the aqueous solution became pH 12. The same amounts of $NH_4OH$ and NaOH were continuously added while maintaining the same temperature and pH.

The metal-containing compound particles formed as a result were separated, washed and dried in an oven at 120° C. The prepared metal-containing compound particles were mixed with lithium hydroxide as a lithium raw material in a molar ratio of 1:1.07, and the result was heat treated at 850° C. to prepare a positive electrode active material.

PREPARATION EXAMPLE: PREPARATION OF LITHIUM SECONDARY BATTERY

A lithium secondary battery was manufactured using each of the positive electrode active materials prepared in Examples 1 to 4 and Comparative Example 1.

In detail, a composition for forming a positive electrode (viscosity: 5000 mPa·s) was prepared by mixing the positive electrode active material prepared in Examples 1 to 4 and Comparative Example 1, a carbon black conductor and a PVdF binder in a weight ratio of 95:2.5:2.5 in an N-methylpyrrolidone solvent, the composition was applied on an aluminum current collector, and the result was dried at 130° C., and then rolled to prepare a positive electrode.

In addition, a composition for forming a negative electrode was prepared by mixing natural graphite as a negative electrode active material, a carbon black conductor and a PVdF binder in a weight ratio of 85:10:5 in an N-methylpyrrolidone solvent, and the composition was applied on a copper current collector to prepare a negative electrode.

An electrode assembly was prepared by placing a porous polyethylene separator between the positive electrode and the negative electrode prepared as above, the electrode assembly was placed inside a case, and then an electrolyte liquid was injected into the case to manufacture a lithium secondary battery. Herein, the electrolyte liquid was prepared by dissolving 1.0 M lithium hexafluorophosphate ($LiPF_6$) in an organic solvent formed with ethylene carbonate (EC)/dimethyl carbonate (DMC)/ethylmethyl carbonate (EMC) (mixing volume ratio of EC/DMC/EMC=3/4/3).

TEST EXAMPLE 1: OBSERVATION ON PRECURSOR AND POSITIVE ELECTRODE ACTIVE MATERIAL STRUCTURES

The precursor prepared in Example 1 was observed using a field emission scanning electron microscopy (FE-SEM), and from the result, radii and volumes of the core and the precursor particle, a thickness and a volume of the shell, a volume percentage in the precursor were each calculated. The results are shown in the following Table 1.

TABLE 1

|  | Radius (μm) | Volume (μm³) | Percentage (% by volume) |
|---|---|---|---|
| Core | 6.1 | 950.8 | 30 |
| Shell | 3.0* | 2205.8 | 70 |
| Total | 9.1 | 3156.6 | 100 |

In Table 1, * represents the thickness of the shell

Based on the test results, it was identified that the precursor material prepared in Example 1 had a fiber-shaped structure with an aspect ratio of 1 or greater in which the lithium complex metal oxide particles on the core grew from the center to the surface side of the particle in a radial form, and the shell area in the precursor calculated according to Mathematical Formula 2 was 0.33.

Figure 2:
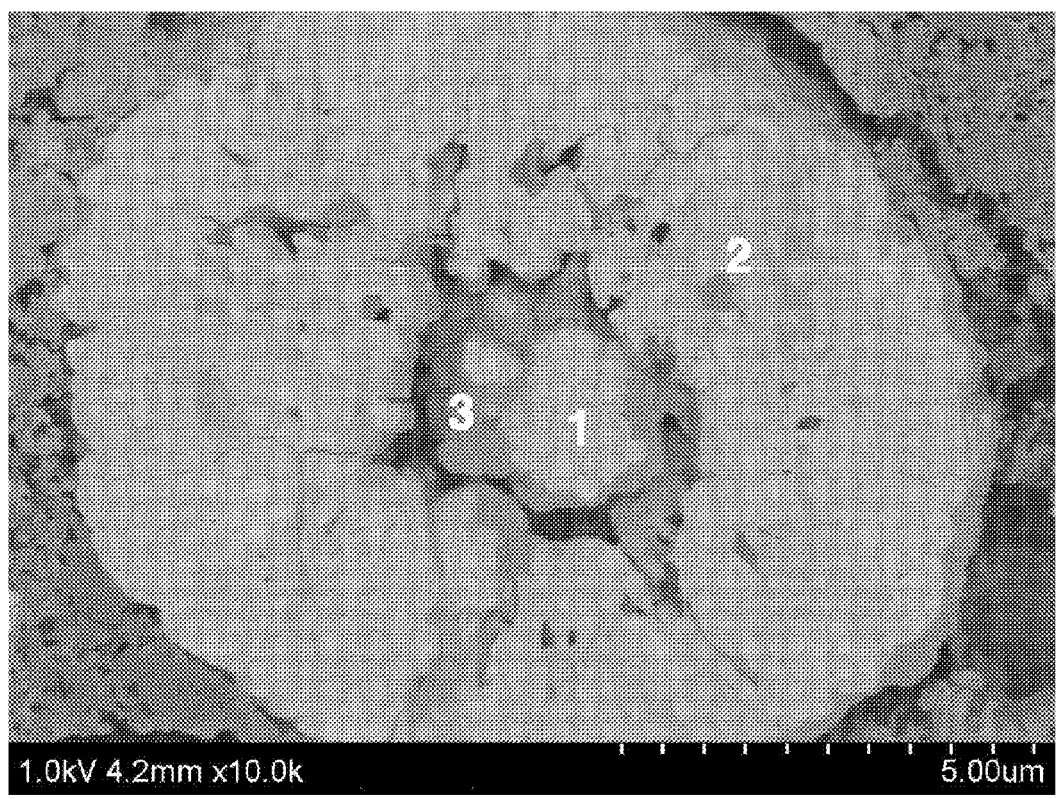
FIG. 2 is a picture observing a section of a positive electrode active material prepared in Example 1 using a field emission scanning electron microscopy (FE-SEM).

In addition, the positive electrode prepared in Example 1 was processed using ion milling, and the section structure of the positive electrode active material was observed using a field emission scanning electron microscopy (FE-SEM). The result is shown in FIG. 2.

The observation result on the section structure identified the formation of a buffer layer (3) including a three-dimensional network structure between the core (1) and the shell (2), and the particles in the shell (2) showed crystal orientation from the particle center toward the surface. In addition, the total particle diameter of the positive electrode active material was 10.7 μm, the radius of the core (1) was 1.05 μm, and the thickness of the shell (2) was 3.14 μm. When converting these values to a volume ratio and calculating porosity in the buffer layer excluding the porosity in the shell, the porosity of the buffer layer (3) in the positive electrode active material was approximately 6.3% by volume.

TEST EXAMPLE 2: EVALUATION ON LITHIUM SECONDARY BATTERY PROPERTIES

Output and cycle properties for the lithium secondary battery manufactured in the preparation example and including each of the positive electrode active materials in Examples 1 and 4, and Comparative Example 1 were evaluated.

In detail, the lithium secondary battery was charged and discharged for 800 times under a condition of 1 C/2 C in a driving voltage range of 2.8 V to 4.15 V at room temperature (25° C.).

In addition, resistance was measured by charging the battery charged and discharged at room temperature (25° C.) based on a SOC of 50% in order to evaluate an output property, and a depth of voltage drop when applying a current was measured based on a SOC of 50% at a low temperature (−30° C.).

As a result, resistance at room temperature (25° C.) and a low temperature (−30° C.), and cycle capacity retention, a ratio of discharge capacity at the $800^{th}$ cycle to the initial capacity after carrying out charge and discharge for 800 times at room temperature, were each measured, and the results are shown in the following Table 2.

TABLE 2

|  | Room Temperature (25° C.) Resistance (mohm) | Low Temperature (−30° C.) Voltage Drop (V) | $800^{th}$ Cycle Capacity Retention (%) at Room Temperature (25° C.) |
|---|---|---|---|
| Example 1 | 1.25 | 1.22 | 94.2 |
| Example 4 | 1.04 | 1.13 | 97.1 |
| Comparative Example 1 | 1.57 | 1.46 | 93.4 |

Based on the test results, the lithium secondary batteries using the positive electrode active materials prepared in Examples 1 and 4 exhibited excellent effects in terms of both an output property at room temperature and a low temperature, and a cycle property, compared to Comparative Example 1, and between the two, the lithium secondary battery using the positive electrode active material of Example 4 in which the surface treating layer was formed exhibited more superior output and cycle properties compared to Example 1.

What is claimed is:
1. A method for preparing a positive electrode active material for a lithium secondary battery, comprising:
preparing a reaction solution in which metal-containing compound particles are produced by adding an ammonium cation-containing complex forming agent and a basic compound to a solution including a metal raw material for forming a lithium complex metal oxide, and coprecipitation reacting under a pH of more than 10.5 to 12 at a temperature of 30° C. to 70° C. under inert atmosphere;
preparing a precursor by further adding the ammonium cation-containing complex forming agent and the basic compound to the reaction solution until the reaction solution has a pH of 10.5 or less to grow the metal-containing compound particles at a temperature lower by 5° C. to 20° C. than the temperature at which the metal-containing compound particles are produced; and
mixing the precursor with a lithium-containing raw material and then heating to form a positive electrode active material,
wherein the pH in the coprecipitation reacting and the pH in the preparing the precursor is different.

2. The method of claim 1, wherein the heating is carried out at a temperature of 700° C. to 1000° C.

3. The method of claim 1, further comprising, after the heating, forming a surface treating layer including a compound of the following Formula 2 on a surface of the positive electrode active material by surface treating the prepared positive electrode active material using a composition including a lithium oxide of the following Formula 2, or mixing the prepared positive electrode active material with a Me raw material and then heating:

$$Li_mMeO_{(m+n)/2} \quad \text{[Formula 2]}$$

in Formula 2, Me includes any one, two or more elements selected from the group consisting of B, W, Hf, Nb, Ta, Mo, Si, Sn and Zr, $2 \leq m \leq 10$, and n is an oxidation number of Me.

4. The method of claim 1, wherein the ammonium cation-containing complex forming agent and the basic compound is included in a molar ratio of 1:10 to 1:2.

5. The method of claim 1, wherein the inert atmosphere is nitrogen or argon atmosphere.

6. The method of claim 1, wherein in the preparing the precursor step by adding the ammonium cation-containing complex forming agent and the basic compound, the pH of the reaction solution is changed at a rate of pH 1 to 2.5 per hour.

7. The method of claim 1, wherein the positive electrode active material comprises:
a core including a first lithium complex metal oxide;
a shell located surrounding the core, and including a second lithium complex metal oxide; and
a buffer layer located between the core and the shell,
wherein the buffer layer includes a pore and a three-dimensional network structure of a third lithium complex metal oxide which is connecting the core and the shell.

8. The method of claim 7, wherein the core is a primary particle of the first lithium complex metal oxide, or a secondary particle that is an aggregate of the primary particles.

9. The method of claim 7, wherein the pore is included in 5% by volume to 30% by volume to the total volume of the positive electrode active material.

10. The method of claim 7, wherein, in the shell, the second lithium complex metal oxide has crystal orientation oriented from the center to the surface of the active material particle in a radial form.

11. The method of claim 7, wherein the shell further includes a pore between particles of the second lithium complex metal oxide.

12. A method for preparing a positive electrode active material precursor for a lithium secondary battery, comprising:
preparing a reaction solution in which metal-containing compound particles are produced by adding an ammonium cation-containing complex forming agent and a basic compound to a solution including a metal raw material for forming a lithium complex metal oxide, and coprecipitation reacting under a pH of more than 10.5 to 12 at a temperature of 30° C. to 70° C. under inert atmosphere; and
growing the metal-containing compound particles by further adding the ammonium cation-containing complex forming agent and the basic compound to the reaction solution until the reaction solution has a pH of 10.5 or less at a temperature lower by 5° C. to 20° C. than the temperature at which the metal-containing compound particles are produced.

13. The method of claim 12, wherein the positive electrode precursor comprises:
a core; and
a shell located on a surface of the core,
wherein the shell includes metal-containing compound particles having crystal orientation oriented from the center to the surface of the precursor particle in a radial form.

14. The method of claim 13, wherein the metal-containing compound particle in the shell has a fiber shape with an aspect ratio of greater than 1.

15. The method of claim 13, wherein the shell has lower density than the core.

16. The method of claim 13, wherein the metal-containing compounds in the core and the shell are each independently include a compound of the following Formula 3:

$$Ni_{1-x-y}Co_xM1_yM3_zM2_wZ \quad \text{[Formula 3]}$$

wherein, in Formula 3, M1 includes any one, two or more elements selected from the group consisting of Al and Mn, M2 includes any one, two or more elements selected from the group consisting of Zr, Ti, Mg, Ta and Nb, and M3 includes any one, two or more elements selected from the group consisting of W, Mo and Cr, Z is a hydroxyl group or an oxyhydroxyl group, and $0<x\leq0.5$, $0<y\leq0.5$, $0\leq z\leq0.03$, $0\leq w\leq0.02$ and $0<x+y\leq0.7$.

* * * * *